July 16, 1946.    W. L. TRAFTON    2,404,110
CABLE HARNESS CLAMP
Filed June 23, 1944

Inventor
Warren L. Trafton.
By Walter S. Jones
Attorney

Patented July 16, 1946

2,404,110

UNITED STATES PATENT OFFICE 2,404,110

CABLE HARNESS CLAMP

Warren L. Trafton, Cambridge, Mass., assignor to United-Carr Fastener Corporation, Cambridge, Mass., a corporation of Massachusetts Application June 23, 1944, Serial No. 541,733

1 Claim. (Cl. 248—74)

The present invention relates to cable harness clamps and the like and aims generally to improve existing clamps for this purpose.

The invention has for its primary object the provision of an improved simplified harness clamp, particularly one adapted to be mounted in an apertured support, of a type permitting the cables secured by the harness clamp to be passed through the aperture of the support.

A further object of the invention is the provision of an improved swivel mounting for such clamps.

The construction of certain types of vehicles, for example, large aircraft, ships, railway cars and the like, frequently includes a plurality of spaced transverse arch beams or girders to reinforce and strengthen the structure. Frequently these are provided with a plurality of relatively large openings for the primary purpose of lighting the structure and it has been proposed to pass a plurality of electrical conductors through these openings. Due to the flexibility of the electrical cables and the vibration imposed upon the vehicle in use, it is desirable to provide a clamp for the cables and a mounting therefor that will permit some freedom of movement of the group of cables relative to the arch support while supporting them to prevent wear of the cable insulation against the apertured support.

The present invention provides a protective clamp for a plurality of cables or the like and a mounting therefor swivelly connected thereto and adapted to be readily attached to a portion of a support surrounding an aperture therein so as to movably mount the clamp in the aperture of the support.

Other objects and advantages of the invention will be apparent from an inspection of the accompanying drawing and annexed description illustrating and describing a preferred embodiment of the invention.

Figure 1:
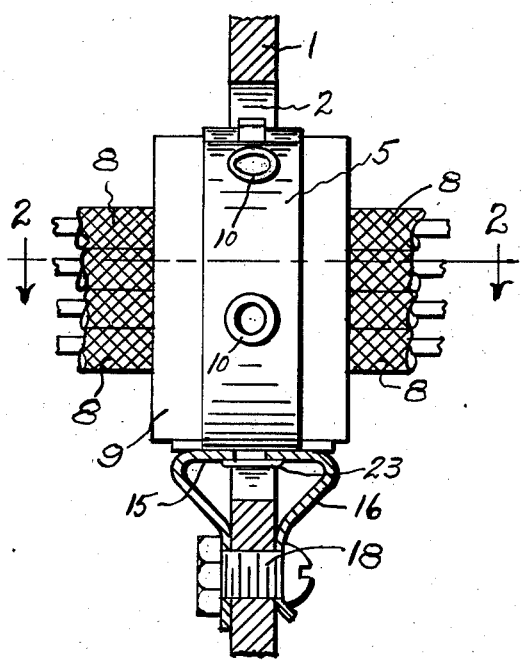
Fig. 1 is a vertical sectional view through an apertured support illustrating in side elevation my improved clamp and mounting in operative position.

Referring to the drawing, a typical installation comprises a clamp for securing a group of electrical cables and means for swivelly mounting the clamp within the aperture of an apertured support. The framework or supporting part 1 may comprise a metal or other structural part having an enlarged aperture 2 which in the case of aircraft may be one of the lightening holes in the supports.

In many installations it is desirable to run a plurality of electrical conductors through the apertures 2 of successive supports 1 and it is desirable to clamp the plurality of conductors in grouped relation. This advantageously may be accomplished by providing a cable clamp composed of a band-like member 5, the ends of which may be formed with reversely disposed hooked ends 6 and 7 to be readily connected together to form a loop to receive and hold a plurality of conductors 8 in grouped relation. The band may have an inner lining of highly flexible insulating material 9 or a strip of sponge rubber connected to the band by suitable means, as for example, by rivets 10.

My invention provides improved and simplified means for mounting and/or swivelly supporting the clamp and grouped conductors, preferably within the aperture 2. Such mounting advantageously comprises a base or bridge 15 and converging legs 16 having terminal fasteners ends 17 for fastener engagement with opposed sides of the support 1. The mounting may be attached to the support by means of a pin 18, such as a bolt or the like, passed through an aperture 18 in the support and apertures 19 in the fastener ends 17.

Figure 4:
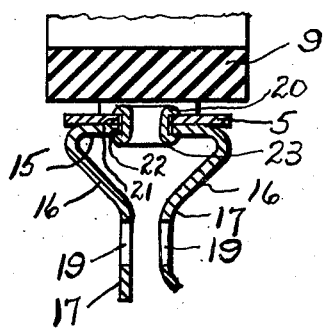
Fig. 4 is a detail sectional view taken on the line 4—4 of Fig. 3.

The band 5 of the clamp is swivelly connected to the base 15 of the mounting by any suitable means, as for example, by a rivet 20 having its head engaging an upper surface of the band 5, and its shank extending through an aperture 21 of the band and an aperture 22 in the base 15 and upset, as at 23, over the inner surface of the base surrounding the aperture 22, as best shown in Fig. 4.

Figure 2:
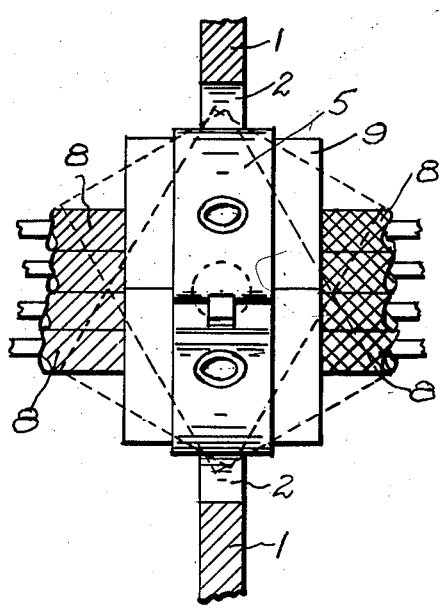
Fig. 2 is a horizontal sectional view taken on the line 2—2 of Fig. 1 and illustrating in plan the improved clamp and mounting and further illustrating in dotted lines various angular positions that the clamp may assume.
Figure 3:
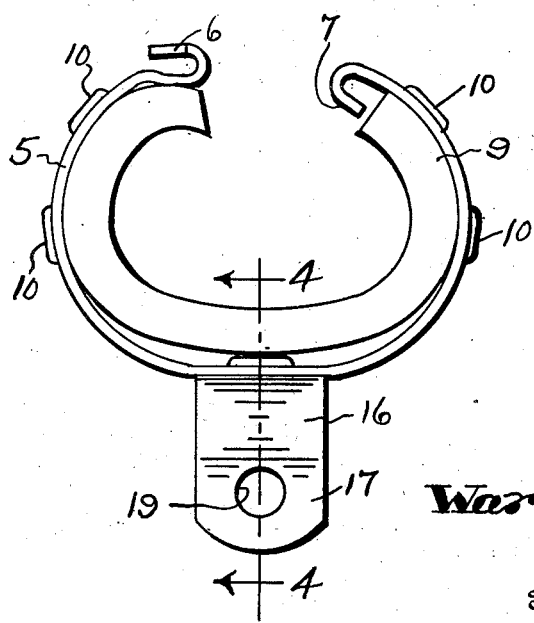
Fig. 3 is a side elevation of the clamp in its open or unclamped position.

The construction above described permits of the mounting of the clamp 5 swivelly within the lightening opening 2 of the support or above any web-like support disposed transversely to the longitudinal direction of the conductors and clamp. As illustrated in Fig. 1, the mounting may be attached to the support 1 by means of a bolt or the like passed through the fastener ends 17 of the mounting and an aperture in the support, permitting pivotal movement or adjustment of the clamp about the axis of the bolt 18. The band 5 forming part of the clamp is capable of pivotal movement about an axis normal to the axis of the bolt 18 because of the swivel connection around the rivet 20 permitting angular adjustment of the band 5 and clamp within the opening 2 and relative to the support 1, as is illustrated in Fig. 2.

The improved clamp and mounting thus enables the clamp to be adjusted angularly within the opening in at least two directions at right angles to each other permitting the clamp to enclose and grip a plurality of strands, such as electric conductors, which may not be accurately positioned exactly at right angles to the opening 2 or support 1.

Although I have illustrated and described a preferred form of my invention, I do not wish to be limited thereby, because the scope of my invention is best defined by the following claim.

I claim:

A cable harness clamp comprising a resilient band having an intermediate base portion, a mounting member for said band having a supporting surface and spaced opposed leg portions extending therefrom, a swivel connection between said supporting surface of said mounting member and the base portion of said band, said leg portions adapted to be engaged with the support for positioning the band relative thereto.

WARREN L. TRAFTON.